Patented Nov. 21, 1950

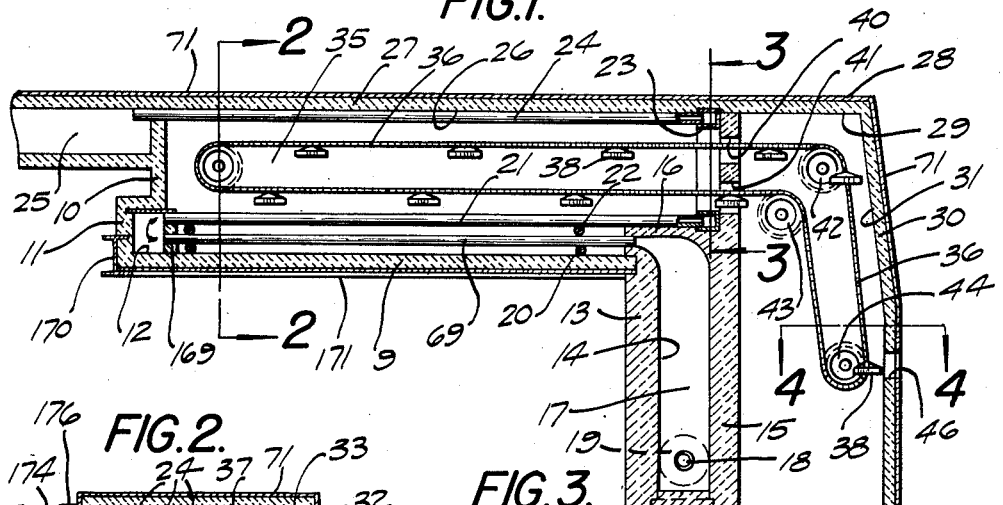

2,530,778

UNITED STATES PATENT OFFICE 2,530,778

BAKE OVEN FOR BAKING VARIOUS FOOD PRODUCTS

Edward H. Otto, Detroit, Mich.

Application August 28, 1947, Serial No. 771,047

6 Claims. (Cl. 107—57)

My invention relates to bake ovens for baking various products, such as pan bread, hearth bread, Vienna rolls, cakes, etc., and has for its object a new and improved form and arrangement whereby the oven is so constructed and arranged that the baking chamber is overhead, increasing the bakeshop oven capacity without additional building expansion costs and occupying a minimum of space, thus permitting the room in which the oven is positioned to be utilized to a large extent for other purposes.

Another object of the invention is that with the baking chamber elevated, the baker can operate the oven from the bakeshop floor level without discomfort as he will not be exposed to direct baking chamber heat and also undue heating of the room is prevented.

Another object of my invention is to provide a new improved combustion chamber which allows for the proper combustion of fuel before entering the oven flue system and provides the oven with a steady continuous heat flow which experience has shown should be at the same rate as the heat absorption by the loaf in order to produce uniform baking results. This construction not only prevents hot spots and often burning out of the flues but will prolong the life of the entire oven itself.

Another object of the invention is the provision of a baking oven of this class so arranged and constructed that a uniform distribution of heat throughout the oven may be accomplished.

Another object of the invention is the provision of a baking oven of this class so arranged and constructed that a maximum efficiency in heating may be obtained.

Another object of my invention is to construct a bake oven that is an overhead traveling oven, that may be easily fired with gas or oil from the bakeshop floor level and adaptable to coal or coke firing in localities where gas or oil as fuel is limited. Experience has shown that with a bake oven constructed in this manner a maximum of efficiency in baking operations is obtained. By having the products to be baked travel in this manner, the baking of the products the proper length of time at a maintained temperature becomes possible.

Another object of the invention is the provision of an oven so constructed and arranged that pans containing the goods to be baked may be loaded with the goods while on a conveyor chain and caused to travel through the oven and outwardly into a receiving chamber at which the baked products are removed.

Other objects will appear hereinafter.

It is recognized that various modifications and changes may be made in the detail of structure illustrated without departing from the invention and it is intended that such shall be embraced within the scope of the claims which form a part hereof.

Forming a part of this specification are drawings in which,

Fig. 1 is a central, vertical, sectional view of the invention,

Fig. 2 is a sectional view taken on line 2—2 of Fig. 1 with a part broken away and a part shown in section, Fig. 3 is a fragmentary sectional view taken on line 3—3 of Fig. 1, Fig. 4 is a sectional view taken on line 4—4 of Fig. 1, Fig. 5 is a fragmentary sectional view taken on line 5—5 of Fig. 3, Fig. 6 is an enlarged sectional view taken on line 6—6 of Fig. 3.

As shown in the drawings, the oven comprises a bottom wall 9 and a rear wall 10 having an outwardly bulged portion 11 to provide a chamber 12. The oven also comprises a top wall 27 and side walls 34 and 35. A supporting wall 13 forms with the wall 15 a combustion chamber 14 which is provided with a top 16 and this combustion chamber 14 is closed at its opposite sides by the side walls 17. Connecting through one of the side walls 17 is a nozzle 18 of a gas or oil burner 19 which is adapted to provide the necessary heat. The hot gases travel in the directions indicated by the arrows in Fig. 1, and are adapted to pass through the tubes 69 which are within the oven chamber 26 and which rest upon the transverse supporting rods 20 which maintain the pipes 69 in elevated relation to the bottom side. These tubes 69 extend through the wall 169 and communicate with the chamber 12. Resting upon the pipes 69 are transverse supporting rods 22 on which the return pipes 21 rest. These return pipes communicate with a manifold 23 which is connected by the pipes or flues 24 to the outlet flue 25, so that there is thus an even distribution of heat in the oven, the heating tubes or pipes being so spaced so as to effect the most desirable distribution of heating in the oven. Extending forwardly from the top wall 28 of the oven is the extension 29 which forms with the front wall 30 and side walls a loading compartment 31. Mounted on the stub shafts 32 which are suitably journalled in the walls 34 and 35 are sprocket wheels 33 over which is adapted to ride a pair of endless sprocket chains 36. These sprocket chains are connected at spaced apart intervals by the supporting rods 37, on which is rockably supported a baking pan 38 having the inverted U-shaped handle 39 through which the rods 37 project so that the baking pan 38 is thus rockably or pivotally mounted.

It will be noted that these baking pans are of such length as to clear the sprocket wheels 33 as clearly shown in Fig. 3. These sprocket chains pass through the openings 40 and 41 formed in the front wall 28 of the oven, these openings 40 and 41 being of sufficient size to permit the pans to pass therethrough. The sprocket chains also pass over the sprocket wheels 43 and 44, the sprocket wheel 44 being driven by a suitable electric motor 45 so that a traveling of a sprocket chain or conveyor chains may be maintained. Formed in the wall 30 is an opening 46. Through this opening 46 the bread or other articles to be baked would be placed upon the pan as the pan comes into alignment with the opening 46 and this pan would then travel upwardly to pass into the oven and traverse the oven lengthwise and return to again become aligned with the opening 46 at which time the baked product would be removed through the opening 46. The timing of travel may be such as to retain the article in the oven, depending upon the nature of article to be baked and the temperature of the oven, a sufficient length of time to complete the baking operation by the time the article returns to the opening 46.

The walls of the oven and the various compartments may be made of any suitable material, such as steel and insulated materials, fire-brick, or the like, and I have illustrated these walls covered by covering 71 which may be a metal or any other desirable material. The oven is also supported by the I-beams 170 and 171 which are positioned above the lower face of the bottom 9.

Experience has shown that with an oven constructed in this manner, a maximum of efficiency in baking operations is obtained particularly so far as fuel consumption is concerned. By having the articles travel in this manner, the baking of the article the proper length of time at a maintained temperature becomes possible and the operator loading or unloading the baking pans or trays is subjected to a minimum discomfort because of the presence of heat.

By having the oven elevated the undue heating of a room is prevented and the space beneath the oven is available for other purposes as it is intended that the distance from the bottom of the oven to the floor would be approximately six feet, eight inches, thus allowing ample space for a man to move around under the oven and carry on activities which would permit the use of the space beneath the oven. By having the opening 46 at the proper height, the pans may be easily and quickly loaded with a minimum amount of labor by the operator performing this task.

The arrangement and construction of the combustion chamber located conveniently at the same end of the oven as the oven charging door, as illustrated in the drawings, together with damper at upright flue facilitates easy operation of the oven. A damper 173 may be rotated by a gear 174 which may be rotated or rocked by the chain 175. This damper is mounted in a flue 176, which is exterior of the oven and which communicates through the wall 35 with the manifold 23. The damper at the upright flue regulates the heat flow and oven temperature and can be regulated according to the kind of goods to be baked. However, experience has shown that once the operator becomes accustomed to the oven, he sets the damper only once which position particularly becomes stationary.

What I claim as new is:

1. An oven construction of the class described, comprising: an oven; a combustion chamber at one end of said oven, said oven being supported on said combustion chamber and extending horizontally therefrom in elevated relation to the supporting surface of the combustion chamber; a heating element for supplying hot gases to said combustion chamber; tubes for conducting said hot gases lengthwise to the rear end of said oven; return tubes for conducting hot gases lengthwise to the forward end of said oven; a manifold at the forward end of said oven, said second mentioned tubes communicating at one of their ends with said manifold; tubes at the upper side of said oven communicating at one of their ends with said manifold and extending longitudinally of and within said oven at the upper side thereof; a forward wall on said oven having an inlet opening and outlet opening formed therein; an endless conveyor projecting through said openings; baking pans carried by said endless conveyor and adapted for being carried by the same longitudinally of said oven, inwardly through one of said openings and outwardly through the other of said openings.

2. An oven construction of the class described, comprising: an oven; a combustion chamber at one end of said oven, said oven being supported on said combustion chamber and extending horizontally therefrom in elevated relation to the supporting surface of the combustion chamber; a heating element for supplying hot gases to said combustion chamber; tubes for conducting said hot gases lengthwise to the rear end of said oven; return tubes for conducting hot gases lengthwise to the forward end of said oven; a manifold at the forward end of said oven, said second mentioned tubes communicating at one of their ends with said manifold; tubes at the upper side of said oven communicating at one of their ends with said manifold and extending longitudinally of and within said oven at the upper side thereof; a forward wall on said oven having an inlet opening and outlet opening formed therein; an endless conveyor projecting through said openings; baking pans carried by said endless conveyor and adapted for being carried by the same longitudinally of said oven inwardly through one of said openings and outwardly through the other of said openings; a compartment forwardly of said oven; a forward wall on said compartment having an opening formed therethrough, said opening being positioned below the location of the openings in said oven wall, and said conveyor passing said opening leading into said compartment for rendering access to materials on the pans carried by the conveyor.

3. In an oven of the class described, a combustion chamber adapted for resting on a supporting surface and projecting upwardly therefrom; a baking oven, one end of said baking oven being supported on the upper end of said combustion chamber in elevated relation to said supporting surface; means for conducting hot gases from said combustion chamber longitudinally of said baking oven; a compartment positioned forwardly of said baking oven and extending from said supporting surface upwardly to the upper side of said oven and having, at a point positioned below the lower side of said oven, an opening formed in its forward wall; a conveyor traversing said oven and passing said opening; and a plurality of baking pans mounted on said conveyor in spaced relation.

4. In an oven of the class described, a combustion chamber adapted for resting on a supporting surface and projecting upwardly therefrom; a baking oven, one end of said baking oven being supported on the upper end of said combustion chamber in elevated relation to said supporting surface; means for conducting hot gases from said combustion chamber longitudinally of said baking oven; a compartment positioned forwardly of said baking oven and extending from said supporting surface upwardly to the upper side of said oven and having, at a point positioned below the lower side of said oven, an opening formed in its forward wall; a conveyor traversing said oven and passing said opening; a plurality of baking pans mounted on said conveyor in spaced relation; a forward wall on said oven, said wall having one opening positioned above another opening and said openings providing space for the travel of the conveyor therethrough.

5. An oven of the class described, comprising: a combustion chamber resting on a supporting surface and projecting upwardly therefrom; a baking oven, supported at one end on said combustion chamber in spaced relation to the supporting surface and projecting horizontally in parallel relation to the supporting surface; means for supporting the opposite end of said oven; conduits for conducting hot gases from said combustion chamber longitudinally of said oven at the bottom and the top thereof; a forward wall on said oven having a pair of openings mounted therein, one being positioned above the other; a compartment mounted forwardly of said oven, said openings communicating with said compartment; a forward wall on said compartment having an opening formed therein below the openings formed in said oven wall; a conveyor traversing longitudinally of said oven and passing inwardly through the other opening in the oven wall and thence extending downwardly for passing the opening formed in said compartment wall; and a plurality of baking pans on said conveyor in spaced relation, said pans being individually accessible through the opening in said compartment wall upon registration of the same with said opening.

6. In an oven of the class described, a combustion chamber resting on a supporting surface and projecting upwardly therefrom; a baking oven, supported at one end on said combustion chamber in spaced relation to the supporting surface and projecting horizontally in parallel relation to said supporting surface; a support for the opposite end of said oven; conduits for conducting hot gases from said combustion chamber longitudinally of said oven; a forward wall on said oven having a pair of openings mounted therein, one being positioned above the other; a compartment mounted forwardly of said oven, said openings communicating with said compartment; a forward wall on said compartment having an opening formed therein; a conveyor traversing longitudinally of said oven and passing inwardly through one of said openings in the oven wall and outwardly through the other of said openings in the oven wall and passing the opening formed in said compartment wall; and a plurality of baking pans on said conveyor in spaced relation, said pans being individually accessible through the opening in said compartment wall upon the registration of the same with said opening.

EDWARD H. OTTO.

REFERENCES CITED

The following references are of record in the file of this patent:

UNITED STATES PATENTS

| Number | Name | Date |
|---|---|---|
| 1,097,229 | Jacobi | May 19, 1914 |
| 1,127,259 | Jones | Feb. 2, 1915 |
| 1,844,178 | Reese | Feb. 9, 1932 |
| 2,090,204 | Hoppe | Aug. 17, 1937 |
| 2,189,167 | Cook | Feb. 6, 1940 |